United States Patent
Langbein et al.

(10) Patent No.: US 10,022,806 B2
(45) Date of Patent: Jul. 17, 2018

(54) DAMPING ELEMENTS FOR TOOL CHUCKING SYSTEMS

(71) Applicant: HAIMER GMBH, Igenhausen (DE)

(72) Inventors: Peter Langbein, Menden (DE); Dietrich Lembke, Leipzig (DE)

(73) Assignee: HAIMER GMBH, Igenhausen (DE)

( * ) Notice: Subject to any disclaimer, the term of this patent is extended or adjusted under 35 U.S.C. 154(b) by 0 days.

(21) Appl. No.: 14/916,003

(22) PCT Filed: Sep. 9, 2014

(86) PCT No.: PCT/EP2014/069225
§ 371 (c)(1),
(2) Date: Mar. 2, 2016

(87) PCT Pub. No.: WO2015/032996
PCT Pub. Date: Mar. 12, 2015

(65) Prior Publication Data
US 2016/0199918 A1   Jul. 14, 2016

(30) Foreign Application Priority Data

Sep. 9, 2013   (DE) .................... 20 2013 008 019 U (51) Int. Cl.
*B23B 27/00*   (2006.01)
*B23B 31/117*   (2006.01)
(Continued)

(52) U.S. Cl.
CPC ........ *B23B 31/1179* (2013.01); *B23B 27/002* (2013.01); *B23B 29/022* (2013.01);
(Continued)

(58) Field of Classification Search
CPC ....... Y10T 409/304312; Y10T 82/2585; Y10T 82/2595; Y10T 82/30; B23B 29/00;
(Continued)

(56) References Cited

U.S. PATENT DOCUMENTS 2,003,025 A   5/1935   Westerbeck
5,197,720 A   3/1993   Renz et al.
(Continued)

FOREIGN PATENT DOCUMENTS

DE   3909630 A1   9/1990
DE   4128446 C1 *   8/1992   ........... B23B 31/202
(Continued)

OTHER PUBLICATIONS

English translation of International Search Report dated Nov. 4, 2014 for International Application PCT/EP2014/069225, dated Sep. 9, 2014.
(Continued)

*Primary Examiner* — Nicole N Ramos
(74) *Attorney, Agent, or Firm* — Paul D. Bianco; Gary S. Winer; Fleit Gibbons Gutman Bongini & Bianco PL (57) ABSTRACT

Damping elements for tool chucking systems for damping vibrations and shocks that occur during machining in the case of force-fitting clamping of tools in a tool receptacle or on the tool itself. At least one damping element consisting of a shape memory alloy having a mechanical effect is provided in a tool chucking system or on the tool itself, such that the damping element provided in the chucked state in the force flow of the chucked elements is present in a reversible and hysteresis-dependent state by way of a mechanical force action and the associated crystalline conversion via the pretensioning of said damping element and leads to dissipation of mechanical energy. The mechanical energy to be damped is a cyclical vibration or represents a non-cyclical overload which is transmitted in the form of shocks.

18 Claims, 9 Drawing Sheets

(51) Int. Cl.
*B23B 31/02* (2006.01)
*B23B 31/107* (2006.01)
*B23B 31/20* (2006.01)
*B23B 29/02* (2006.01)

(52) U.S. Cl.
CPC .......... *B23B 31/02* (2013.01); *B23B 31/1075* (2013.01); *B23B 31/202* (2013.01); *B23B 2228/16* (2013.01); *B23B 2231/2048* (2013.01); *B23B 2250/16* (2013.01)

(58) Field of Classification Search
CPC ....... B23B 29/022; B23B 27/00; B23B 27/02; B23B 31/02; B23B 31/1075; B23B 31/1179; B23B 31/202; B23B 2228/16; B23B 2231/2048; B23B 2250/16
USPC ......................................................... 267/137
See application file for complete search history.

(56) References Cited

U.S. PATENT DOCUMENTS

| | | | | |
|---|---|---|---|---|
| 5,277,435 A | * | 1/1994 | Kramer | ................ B23B 31/201 |
| | | | | 279/156 |
| 5,957,016 A | * | 9/1999 | Segalman | ............... B23B 31/00 |
| | | | | 409/141 |
| 6,012,881 A | | 1/2000 | Scheer | |
| 6,260,858 B1 | * | 7/2001 | DeLucia | ............. B23B 31/1179 |
| | | | | 279/102 |
| 6,749,376 B2 | * | 6/2004 | Keefe | .................. B23B 31/117 |
| | | | | 407/119 |
| 7,150,680 B2 | * | 12/2006 | White | .................. A61B 17/162 |
| | | | | 403/297 |
| 8,020,474 B2 | * | 9/2011 | Mihic | .................. B23B 27/002 |
| | | | | 408/143 |
| 2002/0071728 A1 | | 6/2002 | Keefe | |
| 2003/0025282 A1 | | 2/2003 | Rivin | |
| 2012/0237309 A1 | * | 9/2012 | Park | ........................ B23B 31/02 |
| | | | | 408/240 |
| 2015/0016905 A1 | | 1/2015 | Haimer | |

FOREIGN PATENT DOCUMENTS

| | | | |
|---|---|---|---|
| DE | 19605157 A1 | 9/1996 | |
| DE | 19860254 C1 | 5/2000 | |
| DE | 102011016463 A1 | 10/2012 | |
| DE | 102012100976 A1 | 8/2013 | |
| DE | 102013108209 B3 | 12/2014 | |
| JP | 2005074603 A | 3/2005 | |
| JP | 2013099371 A | 5/2013 | |
| KR | 20110064708 A * | 6/2011 | ............ B23B 31/02 |
| KR | 20110082443 A | 7/2011 | |
| KR | 20110093239 A | 8/2011 | |
| KR | 20110099881 A | 9/2011 | |
| WO | 2008015451 A1 | 2/2008 | |

OTHER PUBLICATIONS

Written Opinion dated Mar. 12, 2015 for International Application PCT/EP2014/069225, dated Sep. 9, 2014.
English Translation of Written Opinion dated Mar. 12, 2015 for PCT/EP2014/069225, filed Sep. 9, 2014.
English Translation of International Preliminary Report on Patentability dated Mar. 15, 2016 for PCT/EP2014/069225, filed Sep. 9, 2014.

* cited by examiner

DAMPING ELEMENTS FOR TOOL CHUCKING SYSTEMS

FIELD OF THE INVENTION

The present invention relates to damping elements for tool chucking systems for damping vibrations and shocks occurring during machining while tools are force-fittingly clamped in a tool receptacle or on the tool itself.

BACKGROUND

It is known that shape memory alloys are used in a great variety of technical applications. Shape memory alloys based on pseudoelastic properties are used, e.g., as spring damping elements and as solid-state elements since the components made of a shape memory material remember the shape previously imparted to them by means of an annealing treatment. Thus, the excellent deformation capacity of the shape memory alloys and the damping capacity, which is high compared to that of many metals, are used, for example, in sports equipment, to damp the shock- and vibration-like stresses exerted on the sport equipment during use, as described in DE 10 2011 016 463 A1.

It is known that in tool chucking systems, vibrations occur as a result of machining. These vibrations are introduced by the tool into the chucking system and are responsible for a shorter service life of the tool and for an inferior surface quality of the workpiece that is to be machined. The reduction of vibrations in tools and tool chucking systems is therefore an important technical and economic goal. In many cases, the design of prior-art systems used to reduce vibrations is very complex and expensive.

In particular, active damping systems based on piezoceramic materials require technically complex and cost-intensive electronics. In addition, these systems also require an external source of electric power, which in most cases is difficult to supply.

It is known that shape memory alloys have two different effects. First is the thermal effect, which is based on the pseudoplastic deformation in the martensitic state and on the fact that the strength of martensite is lower than that of austenite. The resultant change of shape is permanent. When the material is subsequently heated to a temperature higher than the phase transition temperature, the original shape of the specimen will return during the transition into the austenitic phase; this is also referred to as the so-called shape memory effect or simply memory effect. This effect is especially useful in control elements or actuators. In a tool chucking system, such a control element can increase the clamping effect in that, beginning at a specific temperature, the control element takes on a shape which allows a tool to be inserted and subsequently assumes a shape which improves the holding force that is exerted on the tool.

The person skilled in the art distinguishes between two different types of shape memory, i.e., the one-way effect and the two-way effect. The one-way effect refers to the behavior of a shape memory element, which, when exceeding a specific temperature threshold, takes on a specific shape. A deformed shape memory alloy, as it were, "remembers" its original shape and returns to it when this temperature threshold is exceeded. If no additional forces are exerted on the shape memory element, this shape is retained even when the temperature decreases. The two-way effect describes a behavior which causes a shape memory element to automatically take on a specific shape, both when a specific temperature is exceeded and when the temperature drops below a specific temperature. This type of shape memory element can be induced to change its shape both by heating and by cooling it.

The other effect, which is known as the mechanical or pseudoelastic effect, leads to reversible expansions of a maximum of 8% without the influence of an external change in temperature but through the action of an external force. This pseudoelastic range begins after the range of the conventional elastic deformation ends. Deformation occurs in the austenitic phase and is based on the formation of martensite induced by mechanical stress. When after deformation, the martensite-forming force on the shape memory element is removed, the martensite is retransformed into austenite, and the expansion is reversed at nearly constant stress. Thus, the shape memory element returns to its original shape, i.e., mechanical energy is transformed into potential energy and subsequently releases it again. In contrast to a conventional elastic deformation, during this stress-induced deformation of martensite, a transformation hysteresis is observed. The degree of the hysteresis corresponds to the dissipated energy. This phenomenon can be exploited to damp mechanical energy, and this property therefore makes it possible to produce highly compact solid-state damping elements. In addition, by changing the composition of the alloys used or by thermomechanically pretreating the material, it is possible to change the hysteresis loop area and thus the damping behavior. A change in the damping behavior can also be triggered by a change in ambient temperature.

It is known from the state of the art that there are a number of alloy elements from which a shape memory alloy according to the present invention can be produced. Examples of known shape memory materials and material compositions include, but are not limited to: Ag—Cd, Au—Cd, Cu—Al—Ni, Cu—Sn Cu—Zn, Cu—Zn—Si, C—Zn—Al, Cu—Zn—Sn, Fe—Pt, Mn—Cu, Fe—Mn—Si, Co—Ni—Al, Co—Ni—Ga, Ni—Fe—Ga, Ti—Pd, Ni—Ti, Ni—Ti—Nb, Ni—Mn—Ga, with shape memory alloys based on nickel (Ni) and titanium (Ti) being especially suitable for use according to the present invention. It should be noted that a shape memory element according to the present invention need not be made completely of a shape memory alloy but can also comprise other components, e.g., a steel core, the relevant surface of which is subsequently coated with a shape memory material or which is completely surrounded by said material.

In automatic machining operations, it is known to use clamping tools, the clamping force of which is transferred to the workpiece by means of a pressure medium and a radially deformable expansion sleeve or shrink-fit sleeve. Thus, DE 39 09 630 C2 discloses a clamping tool which allows workpieces to be force-fittingly and extremely precisely clamped to machined contact surfaces of the workpiece by means of an expansion element made of an alloy with shape memory capacity and disposed within the clamping tool, which expansion element, in the untensioned state, has low backlash but mates movably with the workpiece and is subjected to a radial force across its entire surface. To ensure a high degree of expansion of the expansion element when the clamping tool is closed and to make the workpieces with relatively large tolerances mate with the clamping tools, the expansion element is made of a shape memory alloy selected to ensure that at the temperature at which the clamping tool is used, the expansion element is in the range of reversible, stress-induced austenitic/martensitic structure transformation, also known as the pseudoelastic or superelastic range. In addition, DE 198 60 254 C1 discloses a clamping chuck for clamping a shank having an elastic clamping sleeve accommodating said shank and having a shrink-fit sleeve made of a shape memory alloy which surrounds the clamping sleeve with low backlash, with the shrink-fit sleeve being configured in the form of a single- or multiple-thread spiral so as to make it possible to exchange or replace components in the clamping chuck rapidly, thereby obviating the need of heating the cold clamping chuck, which would require a relatively long time. In this case, the shrink-fit sleeve made of shape memory alloys utilizes the thermal shape memory effect.

SUMMARY OF THE INVENTION

Taking this state of the art as the starting point, at least some embodiments of the present invention make available damping elements for single-unit or modularly configured tool chucking systems for damping vibrations and shocks occurring during machining operations in a tool receptacle or in a tool, which damping elements reduce these vibrations that are introduced into the chucking system by the tool or by the machine tool spindle and which lead to a shorter service life of the tool and to an inferior surface quality of the workpiece that is to be machined. In addition thereto, other preferred embodiments of the present invention also use the shape memory effect in order to improve the resultant clamping force between the tool and the tool receptacle and to better bridge the gap between the tool and the receptacle in the release position. In addition, the application of shape memory alloys improves corrosion control.

In U.S. Pat. No. 6,749,376 B2, a tool receptacle is described for which shape memory elements are used for clamping tool shanks. However, the basic idea of the aforementioned invention is limited to the generation of a sufficiently high holding force. In addition, a serious disadvantage of this embodiment is that the tool receptacles described require a separate clamping method which forces the user to purchase special cooling devices for clamping and releasing the tools. The present invention, in contrast, can be implemented using prior art types of clamping chucks. Thus, the user is able to continue to use the previously used clamping method, thereby obviating a complex and expensive switch to another method.

The damping elements are to be configured in such a manner that they have a simple, compact and energy self-sufficient design and that, in the operating state, the damping properties can be temporarily changed. This can be achieved, in particular, by ensuring that the shape memory alloys and shape memory elements are selected and disposed in such a way that an intended behavior results at room temperature and/or at the temperatures prevailing during machining or during the clamping and/or release procedure.

According to the present invention, at least one damping element made of a shape memory alloy having a mechanical effect is disposed in a tool chucking system or on the tool itself in such a manner that the damping element, which in the chucked state is disposed in the force flow of the chucked elements, is in a state of reversible and hysteresis-dependent deformation with its associated crystalline transformation as a result of the damping element having been pretensioned by the action of a mechanical force, which leads to dissipation of mechanical energy, with the mechanical energy to be damped being a cyclic vibration or constituting a non-cyclic overload which is transmitted in the form of shocks.

At least some embodiments of the present invention is to change the damping behavior of the damping element by changing its mechanical properties and thus to adapt it to new states of the system. The change of the properties is determined by the material and is initiated by a change of temperature. When the temperature is increased, the stress-strain hysteresis loop of the pseudoelastic shape memory elements used as damping elements is reduced and the stiffness of the elements is increased so that higher temperatures lead to a less damping and stiffer behavior of the damping elements. In special cases, however, it is also possible to achieve the opposite effect by suitably selecting and treating the shape memory alloy.

The present invention offers the advantage that the damping elements made of shape memory alloys can be configured in different designs. Design configurations used include, for example, washers, cup springs, rings, solid or hollow cylinders, bending strips or torsion bars. Thus, the damping element made of a shape memory material is configured, e.g., in the form of a sleeve and disposed either between a cylindrical shank of a tool and a receiving element of a tool receptacle, and the cylindrical shank of the tool is force-fittingly held in a cylindrically shaped recess in the damping element, or the damping element made of a shape memory material and configured in the form of a sleeve is disposed between a collet chuck and the cylindrical shank of the tool, with an axial force being generated by means of a screw which is disposed on the collet chuck so that the damping element is connected to the cylindrical shank of the tool.

In modularly configured chucking systems which have a tool receptacle in which the shank of a tool module is mounted in a base mount, it is to be preferred that the damping element made of a shape memory material be disposed between the contact surfaces in the tool module or that in a tool chucking system with a tool receptacle in which a boring bar holder with a boring bar and with a flange is mounted on a receiving element of the tool receptacle, annular damping elements made of a shape memory material be disposed in an axial configuration on connecting elements in the receiving element of the tool receptacle.

In another preferred embodiment of the invention, a shape memory element is disposed on the outer circumference of the tool holder. Ideally, such a shape memory element encircles the tool holder in ring-like fashion in the rear clamping region. In this type of configuration, a wedge-shaped cross section, the tip of which points into the direction of the tool, proved especially useful.

Another preferred embodiment provides that for damping purposes, a carrier element not made of a shape memory material is coated with a shape memory material or that the connecting elements themselves or portions of the connecting elements are made of a shape memory material.

Yet another embodiment offers the advantage that the damping elements are made completely of a shape memory material or that the core of the shape memory elements [sic; damping elements] is made of a material not having shape memory properties which is coated with a shape memory material.

The underlying idea of the invention is that the damping elements have a mechanical or pseudoelastic shape memory effect. Because of their special elastic properties, the passive damping elements made of shape memory alloys require considerably less installation space than conventional damping means. In addition, the moment of inertia associated with the weight and the size of the damping elements is considerably lower compared to that of conventional damping elements. This reduces the incidence of imbalance in the system. The advantage of the highly compact design configuration of the damping elements made of a shape memory material is that workpieces with an improved surface quality and, at the same time, with an improved tool service life can be produced without increasing the dimensions of the tools or chucking systems and without requiring the supply of external energy, Another advantage is that the heating process used to change or adjust the damping properties can be externally controlled by means of electric current based on the intrinsic resistance of the shape memory element.

An equally preferred embodiment provides that the damping properties are independently changed or adjusted by changing the temperature of the environment. In this case, the damping element has adaptive functions since, relative to its damping properties, it is able to adapt to its environment.

In especially preferred embodiments of the present invention, the shape memory effect, in addition to the damping properties described, also leads to an improvement of the clamping force. The change in temperature required therefor is ideally integrated into the conventional applications. For example, one possibility is to integrate one or a plurality of shape memory elements into a shrink-fit chuck. Depending on the composition of the shape memory alloy, it is then possible to exploit different effects. In a first step, the shrink-fit chuck is heated so that, owing to the expansion, a tool shank can be inserted. To this end, the at least one shape memory element is disposed in the shrink-fit chuck in such a way that it has to follow the expansion movements of the tool holder or that, as a result of the change in temperature independently of the expansion movement of the shrink-fit chuck, it assumes a shape which allows the insertion of a tool shank. When the shrink-fit chuck with the tool shank inserted therein cools, the shape of the at least one shape memory element changes in such a manner that it sits particularly close to the tool shank. In addition to the damping property already described, the compressive force exerted on the tool shank is increased as well.

It goes without saying that the use of shape memory elements according to the present invention is not limited to the use in shrink-fit chucks. As an example of a non-thermal method, a so-called hydraulic expansion chuck will be described below. Since this type of chuck does not undergo a change in temperature during the clamping procedure, the shape memory effect makes itself felt elsewhere. Because of the use of coolants which are passed either through the tool shank or through the chuck, the temperature resulting in the clamping region of the tool shank is lower than the generally prevailing room or ambient temperature. This is especially the case when cooling involves fluids or gases that are stored at low temperatures and/or remove heat from the environment as they evaporate. One example is the cooling of the tool with carbon dioxide ($CO_2$). When the temperature in the clamping region of the tool shank drops below a specific temperature, at least one shape memory element disposed in the tool holder will change its shape in such a manner that it sits especially close to the tool shank. In addition to the damping property already described, the holding force exerted on the tool shank is increased as well.

Another implementation of the present invention follows from the combination of shape memory elements and a clamping chuck having a sleeve made of CFRP; this type of tool receptacle is described, e.g., in DE 10 2013 108 209. In this type of chuck, it is not the tool holder, but the tool shank that is subjected to thermal action. When a tool shank is cooled to a low temperature, its outside diameter is reduced. This "shrunken" tool shank is subsequently inserted into the tool holder. As a result of the expansion of the tool shank at room temperature, a holding force is generated between the tool and the tool holder. This clamping process can be enhanced by the application of a shape memory alloy or by the incorporation of shape memory elements into the tool shank. During cooling, the shape memory alloy or at least one shape memory element takes on a shape which helps to decrease the outside diameter. In practice, this can be implemented in that a bar-shaped shape memory element is used, which is applied to the outside of the tool shank. At room temperature, this shape memory element has a shape by means of which it increases the outside diameter. When the outside diameter of the tool shank is decreased upon cooling, the shape memory elements takes on a shape that is less than or equal to the outside diameter of the other sections of the tool shank. This allows the section to which the shape memory element has been applied to be inserted into the tool holder.

Especially preferred is a shape memory alloy which, upon returning to room temperature or upon reaching the operating temperature, takes on a shape which enhances the holding force between the tool shank and the tool holder. In the course of the effort to regain its original shape, closer contact between the tool shank, with the shape memory element applied thereon, and the tool holder results.

It goes without saying that the shape of the shape memory element is not limited to the shape of a bar but can vary; for example, it can be configured in the form of one or a plurality of annular elements or in the form of a sleeve which completely or partially encloses the shank.

The advantageous use of a shape memory alloy on tool shanks is not limited to this example. According to the present invention, tool shanks not intended to be used in clamping chucks having a sleeve made of CFRP can, of course, have at least one element made of a shape memory material added to them. In the course of this, influence is preferably exerted on the damping behavior of the shank tool in the tool holder. The form of the shape memory elements applied can be selected depending on the prevailing requirements and/or the shank diameters. In addition to the application of a thin coating of a shape memory material, other forms can lead to the desired result as well, for example, one or a plurality of shape memory elements in the form of rings or partial rings running at right angles to the axis of rotation and completely or partially encircling the tool shank in the clamping region. Also conceivable are bar-shaped shape memory elements which run parallel to the axis of rotation or sleeve-shaped shape memory elements which completely or partially encircle the shank. It is especially useful if these shape memory elements are disposed in grooves provided for this purpose on the tool shank.

Another preferred embodiment provides that different shape memory elements be disposed on the shank of a tool so as to positively influence the properties of the tool after the resultant temperatures. It is also possible to apply alloys to tool shanks especially for use in tool holders with especially low temperatures, for example, using liquefied carbon dioxide ($CO_2$), or especially for use in thermal expansion processes.

It should be especially emphasized that coating with a shape memory alloy and/or applying shape memory alloys to a tool shank is especially beneficial in cases in which a separate shank segment of a screw-in tool is involved. On the one hand, because the separate shank segment can be treated, in particular, alloyed, independently of the screw-in machining segment; on the other hand, because a separate shank segment is used over a longer period of time since in case of signs of wear, as a rule only the screw-in or screw-out machining segment is replaced. This type of system comprising a screw-in cutter head and a separate shank segment has been disclosed, for example, in DE 10 2012 100 976 A1.

The coating of specific segments in tool holders is not limited to the receiving region for shank tools. The clamping region, with which the tool holder is clamped into the tool spindle, can be optimized with a shape memory material as well. To this end, a thin coating of a shape memory material is preferably applied to the contact surface of the clamping region of the tool holder. When the tool holder is fed into to the spindle, this coating is disposed between the clamping region of the tool holder and contact surfaces of the spindle. As a result of the pseudoelastic effect, both damping between the spindle and the tool holder occurs and contact is improved, and, last but not least, the holding force resulting from the elastic deformation is increased.

Because of the great variety of possible applications of shape memory materials, both for improving the damping properties and increasing the clamping force and because of the possibility to resort to different temperature ranges during use, it may be useful to use elements made of different shape memory alloys having in part different properties in a tool holder or on a tool. These different properties may be the result of different alloy elements, different proportions in the composition of the alloy elements and/or different thermal treatments.

Another embodiment of the present invention provides for the application of shape memory elements for damping occurring vibrations and shocks in coolant-carrying bores and/or grooves. To this end, it is preferable to use a shape memory alloy which controls the flow of coolant as a function of the tool and/or machining temperature in a way that leads to an especially desired temperature in the sheath region.

BRIEF DESCRIPTION OF THE DRAWINGS

The invention will be explained in greater detail below with reference to embodiment examples diagrammatically represented in the drawings. As can be seen.

DETAILED DESCRIPTION OF THE INVENTION

Figure 1:
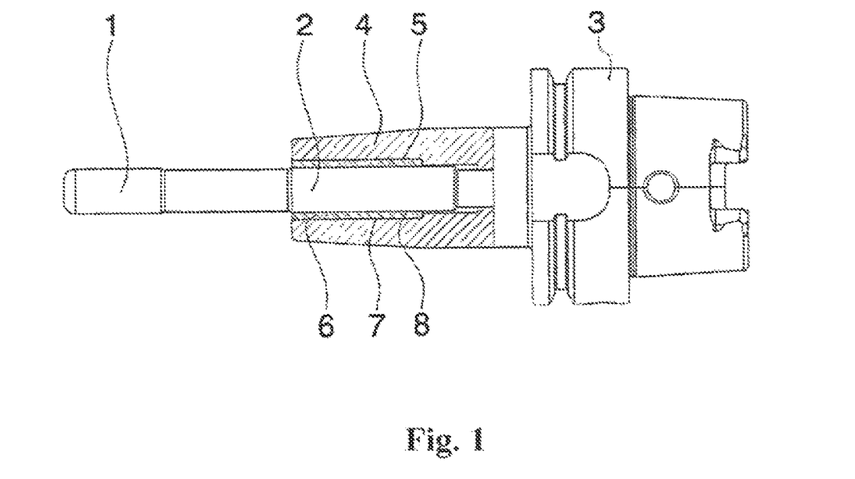
FIG. 1 shows a first embodiment example of a tool receptacle for shank tools in a shrink-fit chuck having a damping element made of a shape memory material.

FIG. 1 shows an embodiment example of a tool receptacle for shank tools in the chucked state. The tool receptacle can be configured on a cylindrical tool shank, e.g., as a thermal shrink-fit chuck, a hydraulic expansion chuck or for similar tool chucking systems with a clamping force in the radial direction.

In the first embodiment example, a cutting tool 1 (milling, drilling, thread-cutting tool) having a cylindrical shank 2 is disposed in a tool receptacle 3. In a cylindrically shaped recess 5 in a receiving element 4 of the tool receptacle 3, a sleeve-shaped damping element 6 made of a shape memory material is disposed, the lateral surface 7 of which is force-fittingly press-fit mounted in the cylindrically shaped recess 5 of the receiving element 4. In the cylindrically shaped recess 8 of the sleeved-shaped shape memory element 6, the cylindrical shank 2, for example, of a cutting tool 1, is force-fittingly press-fit mounted so that the sleeve-shaped damping element 6 is disposed between the cylindrical shank 2 of the cutting tool 1 and the receiving element 4 of the tool receptacle 3. Because of this configuration of the sleeve-shaped damping element 6 made of a shape memory material according to the present invention, the damping element 6 disposed in the force flow undergoes a reversible and hysteresis-dependent deformation as a result of having been pretensioned and, owing to its pseudoelastic properties, is able to damp vibrations and shocks occurring during machining on the contact surfaces of the cutting tool 1 in the tool receptacle 3.

Figure 2:
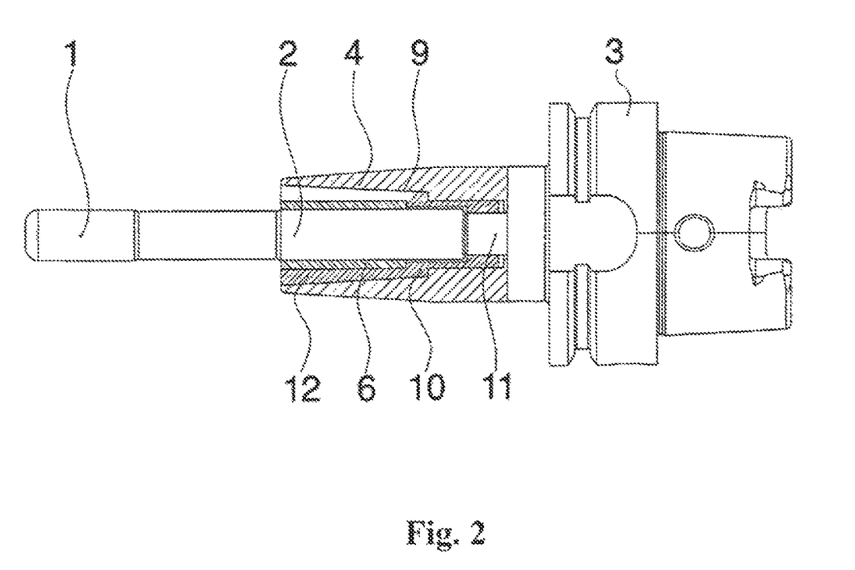
FIG. 2 shows another embodiment example of a tool receptacle for shank tools in a clamping chuck having a damping element made of a shape memory material.
Figure 3:
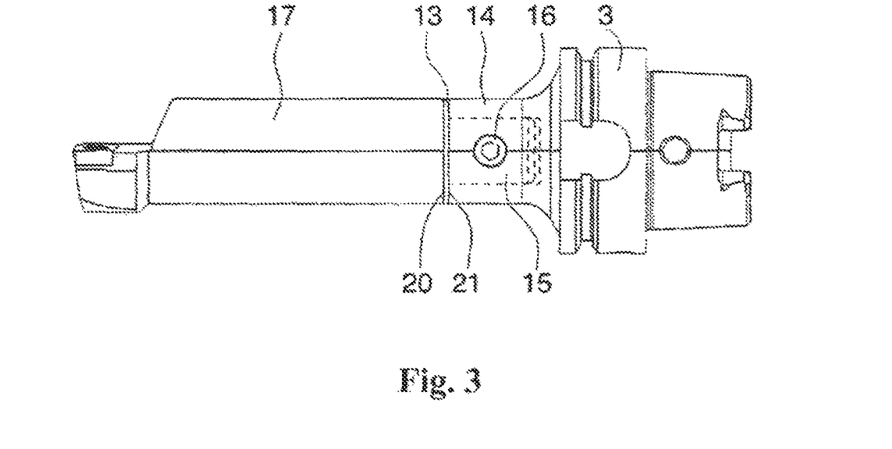
FIG. 3 shows another embodiment example of a tool receptacle for a modular tool system having a damping element made of a shape memory material.
Figure 4:
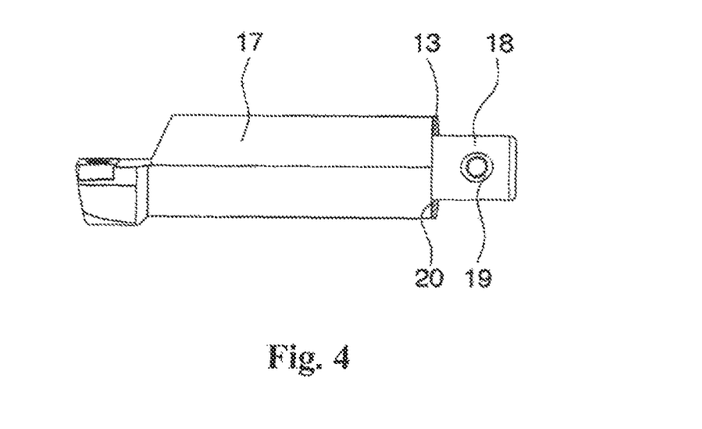
FIG. 4 shows a tool module having a shape memory element in the form of a cup spring.
Figure 5:
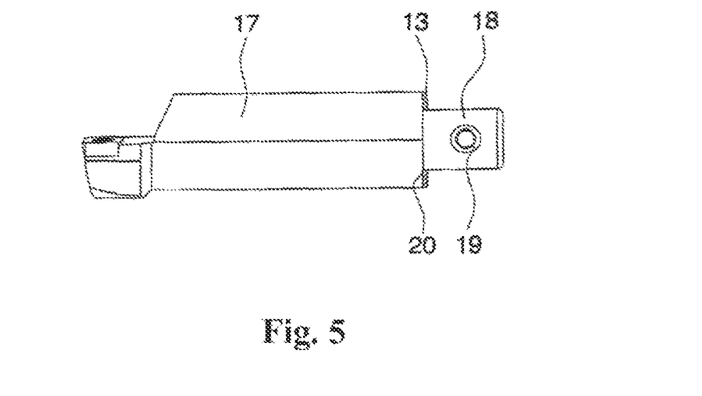
FIG. 5 shows a tool module having a shape memory element in the form of a washer.
Figure 6:
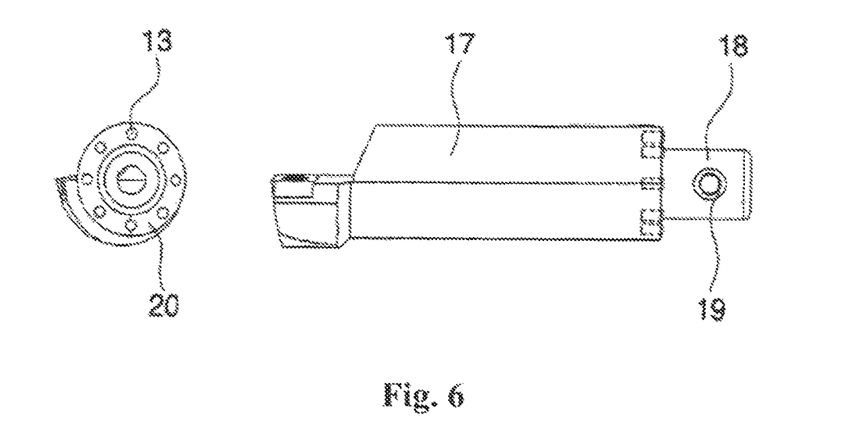
FIG. 6 shows a tool module having concentrically disposed shape memory elements in the form of pins.

FIG. 2 shows another embodiment example of a tool receptacle by means of a clamping device. In the receiving element 4 of the tool receptacle 3, a tapered bore 9 is disposed, into which a collet chuck 10 is inserted in the usual manner. Also disposed between the collet chuck 10 and the cylindrical shank 2 of the cutting tool 1 is the sleeve-shaped damping element 6 made of a shape memory material. By activating a central screw 11, an axial force is generated and the collet chuck 10 is pulled into the tapered bore 9 so that the clamping segments 12 of the collet chuck 10 come to sit close to the sleeve-shaped damping element 6 made of a shape memory material and the damping element 6 is radially clamped together with the cylindrical shank 2 of the cutting tool 1. Because of this configuration of the sleeve-shaped damping element 6 made of a shape memory material according to the present invention, the damping element 6 disposed in the force flow undergoes a reversible and hysteresis-dependent deformation as a result of having been pretensioned and, owing to its pseudoelastic properties, is able to damp vibrations and shocks.

FIGS. 3, 4, 5 and 6 show additional embodiment examples for use of a damping element 13 made of a shape memory material in modular tool systems. In the modular tool system, the tool receptacle 3 comprises a base mount 14 with an inner bore 15 and a radially disposed collet chuck 16, into which the shank 18 of a tool module 17 is inserted and affixed by means of the collet chuck 16, e.g., having a tapered tip, by screwing it into a tapered bore 19 of a shank 18 of the tool module 17. Disposed between the contact surfaces 20 and 21 of the tool module 17 and the base mount 14 is the damping element 13 made of a shape memory material. The damping element 13 is configured, for example, in the form of a cup spring according to [FIG. 4], in the form of a washer according to [FIG. 5], and in the form of a pin according to [FIG. 6]. In the chucked state, the damping element 13 is disposed in the force flow of the chucked elements and undergoes a reversible and hysteresis-dependent deformation.

Figure 7:
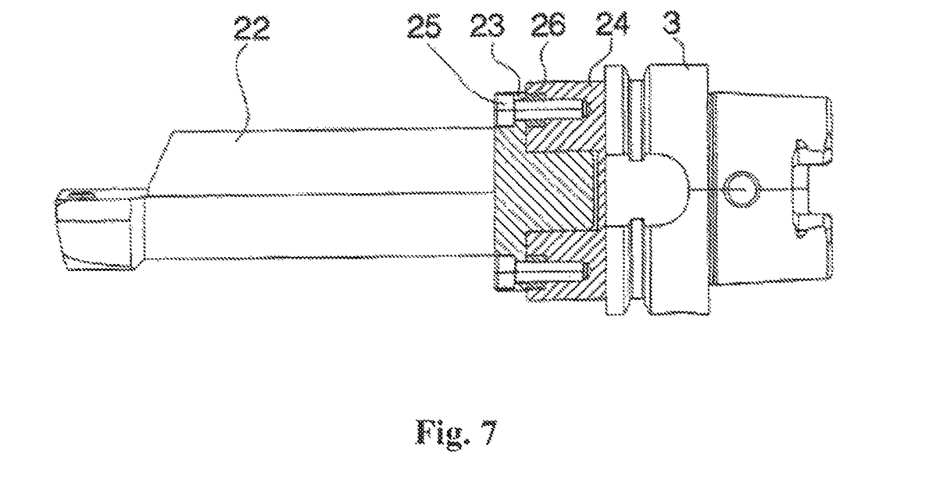
FIG. 7 shows an embodiment example with coaxially disposed shape memory elements.

FIG. 7 shows the use of, for example, two sleeve-shaped damping elements 26 made of a shape memory material in a long cantilevered boring bar holder of a modular tool system. A boring bar 22 is affixed with a flange 23 on a receiving element 24 of the tool receptacle 3 by means of screws 25 or threaded elements, and between the screws 25 and the receiving element 24, sleeve-shaped damping elements 26 are disposed so that the sleeve-shaped damping elements 26 are disposed in the force flow of the chucked elements in a coaxial configuration. The damping elements 26 shown are subjected to pressure loads. A configuration for flexural loading is provided as well. In the chucked state, the damping elements 26 are disposed in the force flow of the chucked elements and undergo a reversible and hysteresis-dependent deformation. In another embodiment (not shown), the damping elements 26 are concentrically configured. In this particular embodiment example, the screws 25 or portions of the screws 25 can also be made of a shape memory material.

Figure 8:
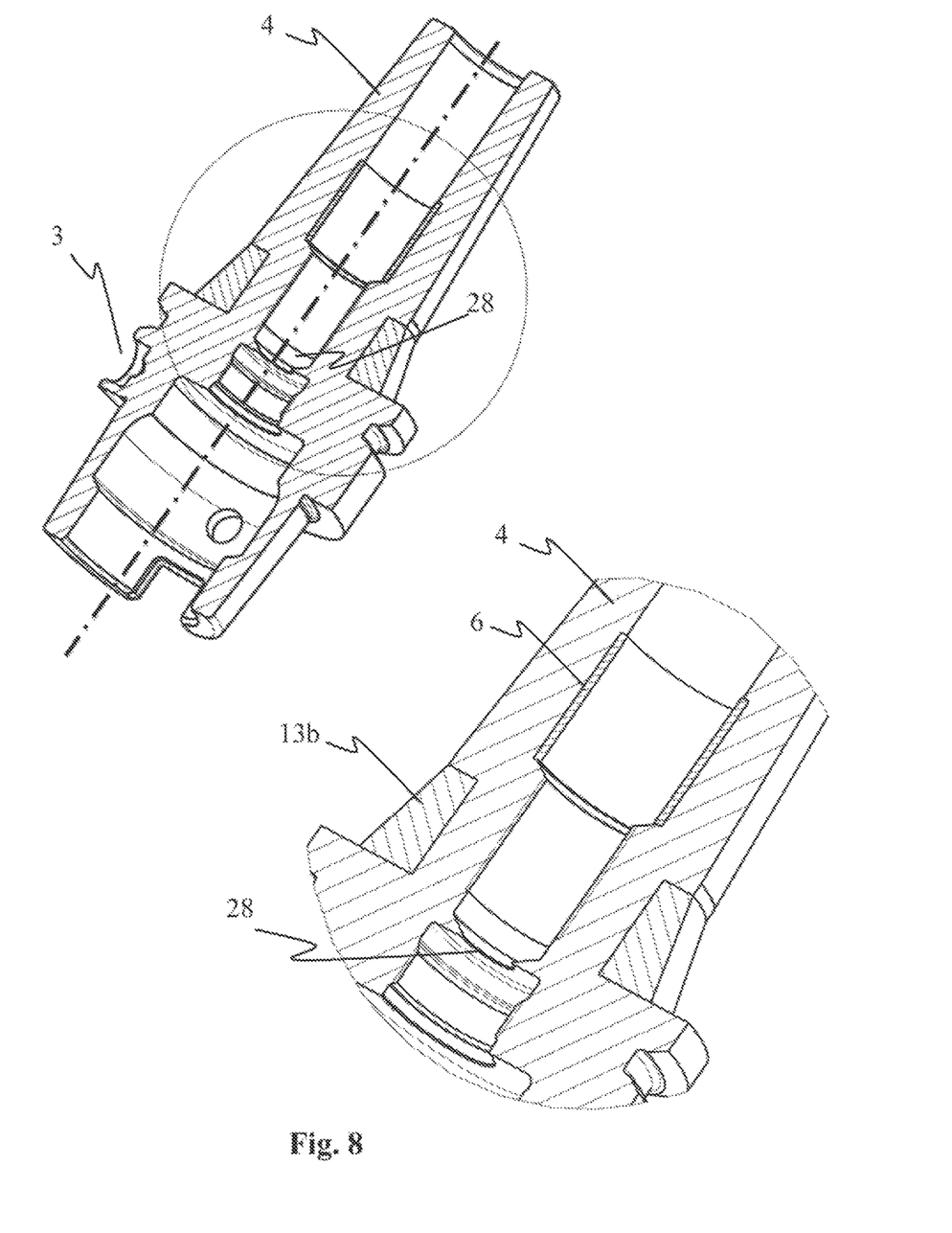
FIG. 8 shows an embodiment example with a shape memory element in the form of an inside sleeve and a damping element made of a shape memory material on the outside circumference, said damping element having a wedge-shaped, annular cross section

FIG. 8 shows another alternative embodiment of a tool receptacle 3 without a clamped tool. A damping element 6 made of a shape memory material in the shape of a sleeve or a partial sleeve is affixed in the rear region of the receiving element 4. The tool receptacle 3 is additionally enclosed by a damping element 13b made of a shape memory material having a tapered annular cross section so as to further improve the vibration behavior.

Figure 9:
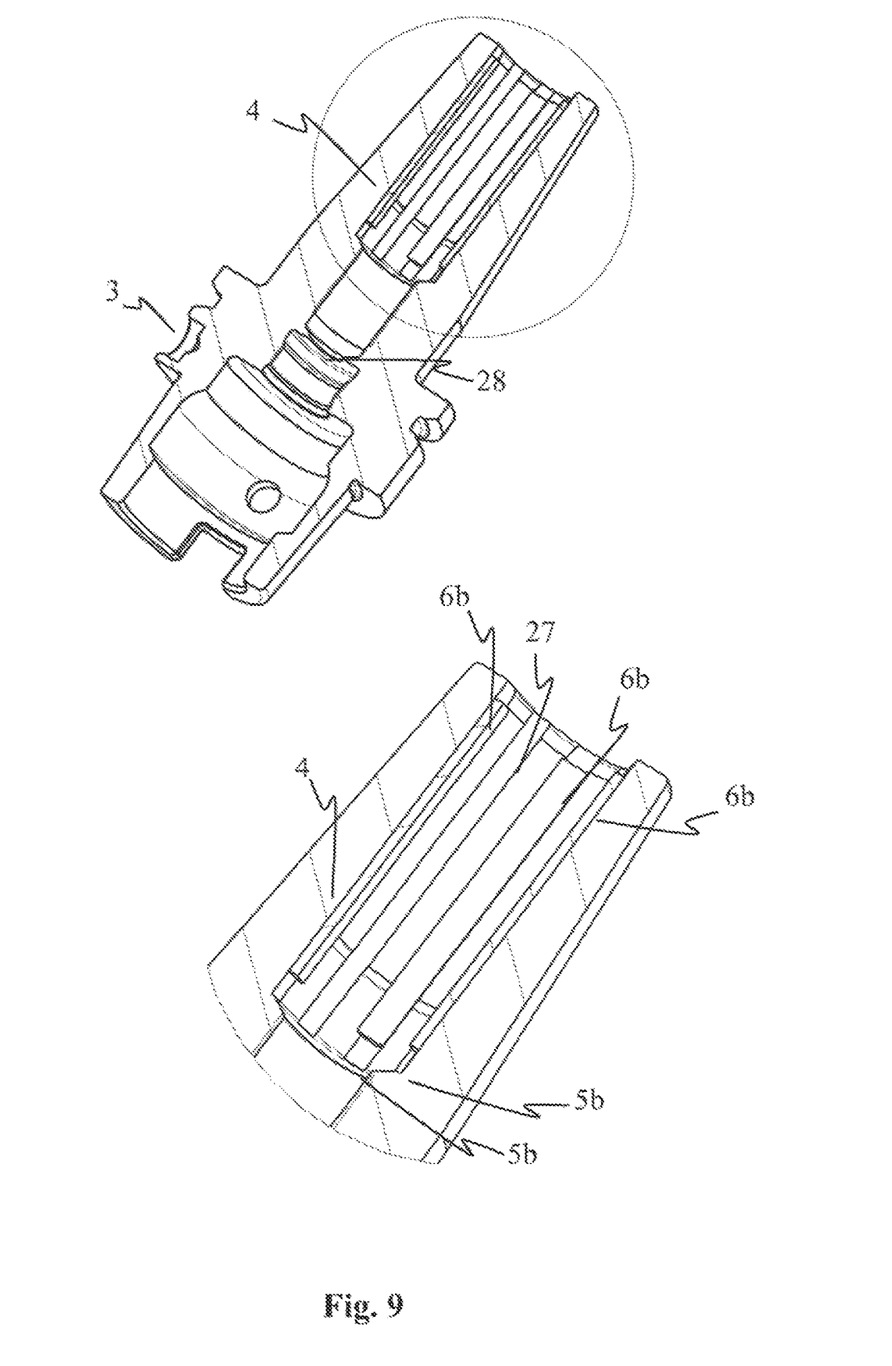
FIG. 9 shows an embodiment example with bar-shaped shape memory elements in a tool receptacle.

FIG. 9 shows another alternative embodiment of a tool receptacle 3 in which bar-shaped damping elements 6b made of a shape memory material are disposed in cylindrically shaped recesses 5b especially provided for this purpose in the receiving element 4. In the drawing, the damping elements 6b made of a shape memory material are exaggerated to clarify their function. If a tool shank (not shown) were to be inserted into the receiving opening, the damping elements 6b made of a shape memory material would be tensioned as a result of an elastic deformation between the receiving element 4 and tool shank (not shown). In an alternative embodiment, the damping elements 6b made of a shape memory material take on a shape that flattens in the direction of the axis of rotation owing to the action of thermal energy during clamping by means of a shrink-fit chuck. The cylindrically shaped recesses 5b of the receiving element 4 preferably have open areas on both so as not to prevent an expansion or deformation resulting from the shape memory effect. In addition, the receiving element 4 can have additional relief grooves 27 running parallel to the bar-shaped damping elements 6b made of a shape memory material. When connected to the coolant through-bore 28, the grooves 27 can also be used as coolant-carrying grooves. In this case, the grooves 27 would be bounded by the shank (not shown) of a shank tool.

Figure 10:
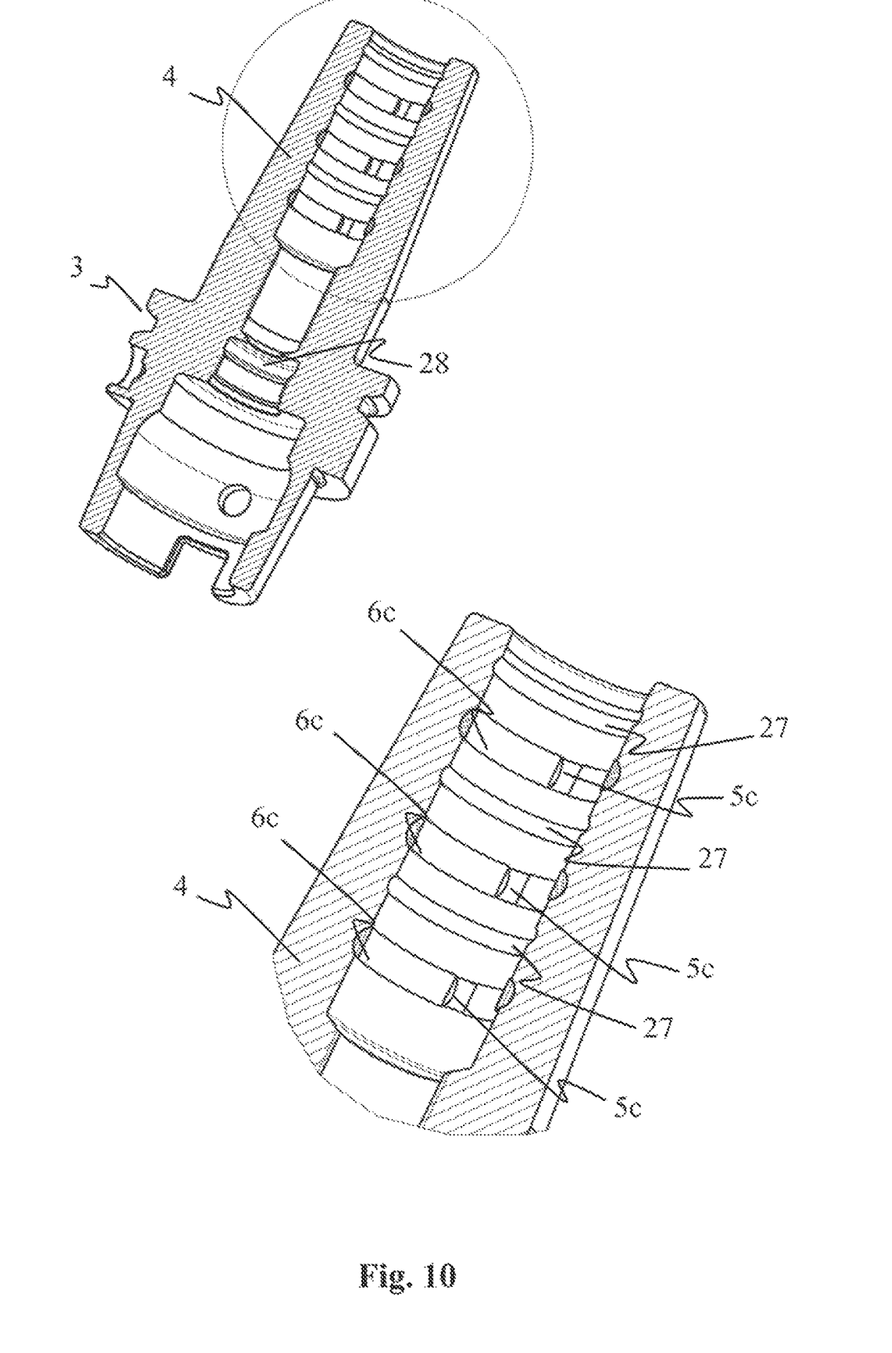
FIG. 10 shows an embodiment example with annular shape memory elements in a tool receptacle.

FIG. 10 shows another alternative embodiment of a tool receptacle 3 in which (partially) annular damping elements 6c made of a shape memory material are disposed in annular recesses 5c especially provided for this purpose in the receiving element 4. In the drawing, the damping elements 6c made of a shape memory material are exaggerated to clarify their function. If a tool shank (not shown) were to be inserted into the receiving opening, the damping elements 6c made of a shape memory material would be tensioned as a result of elastic deformation between the receiving element 4 and tool shank (not shown). In an alternative embodiment, the damping elements 6c made of a shape memory material take on a shape that flattens in the direction of the axis of rotation owing to the action of thermal energy during clamping by means of a shrink-fit chuck. The damping elements 6c made of shape memory material are preferably configured in the shape of partial rings and have an open space between their ends so as to not prevent an expansion or deformation resulting from the shape memory effect. In addition, the receiving element 4 can have additional relief grooves 27 running parallel to the (partially) annular damping elements 6c made of a shape memory material.

Figure 11A:
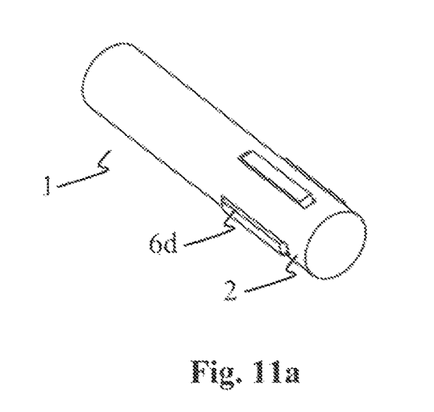
FIG. 11a and FIG. 11b show an embodiment example with bar-shaped shape memory elements on a tool shank in two different states.
Figure 11B:
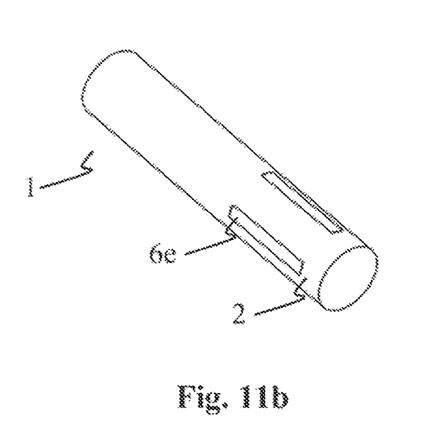

FIGS. 11a and 11b show an embodiment according to the present invention on the tool shank of a cutting tool 1. In this embodiment example, the tool shank has at least one groove 5d which is configured so as to be able to hold a shape memory element 6d. For the sake of greater clarity, the extent to which the bar-shaped damping element made of a shape memory material in Configuration I 6d projects beyond the remainder of the outside circumference is exaggerated. In this example, a plurality of bar-shaped damping elements made of a shape memory material in Configuration I 6d are disposed on the tool shank. Thermal exposure, i.e., exposure to cold or heat, induces the shape memory material to change its shape. Thus, it changes into a bar-shaped damping element made of shape memory material in Configuration II 6e. By reducing the outside diameter, insertion into the receiving element of the tool receptacle is made easier or indeed even made possible. By changing the temperature again, preferably by returning to room temperature or reaching the operating temperature, the shape memory element changes back into a bar-shaped damping element made of a shape memory material in Configuration I 6d. Since the original outside circumference of the segment having at least one such bar-shaped damping element made of a shape memory material in Configuration I 6d is preferably slightly larger than the inside diameter of a tool receptacle (not shown in this figure), not only the damping effect but also the holding force is increased. It goes without saying that the design of the shape memory element is not limited to the shape of a bar, but can have different shapes, for example, annular, partially annular, sleeve-shaped or partially sleeve-shaped. In particular, it should be noted that the shape memory element can also be simply a thin coating on the tool shank.

Figure 12:
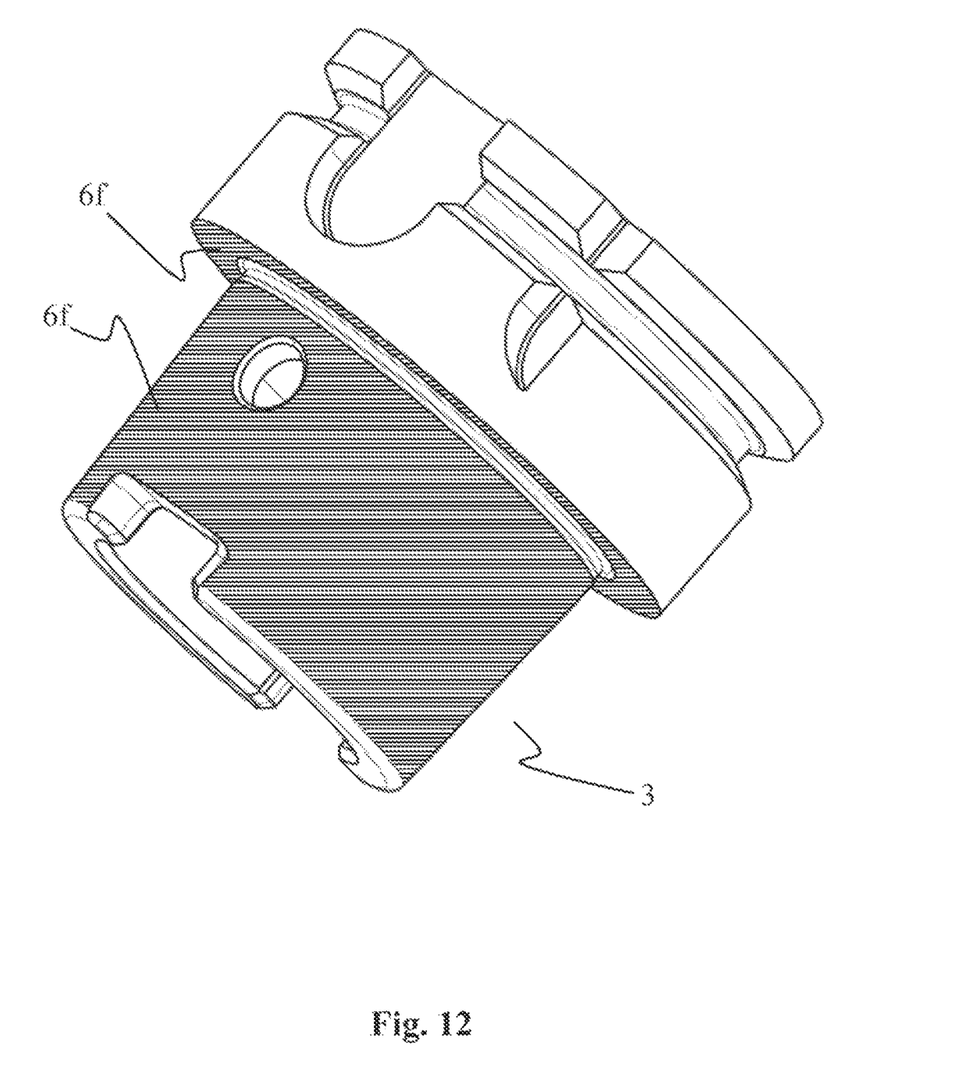
FIG. 12 shows an embodiment example with a hollow taper shank interface coated with an alloy made of a shape memory material.

FIG. 12 shows an embodiment according to the present invention on the interface of a tool receptacle 3 with a spindle (not shown). In the current example, a damping element 6f in the form of a coating made of a shape memory material was applied to a so-called hollow taper shank interface. For use according to the present invention, preferably only a thin coating is applied to the surface of contact with the spindle. It goes without saying that the properties and the material thickness of the shape memory alloy are selected to ensure that the damping action takes effect, but that the tool holder does not yield elastically to such an extent that the clamping precision is impaired. As a result of the pseudoelastic effect, both damping between the spindle and the tool holder 3 occurs and contact is improved, and, last but not least, the holding force resulting from the elastic deformation is increased.

Figure 13:
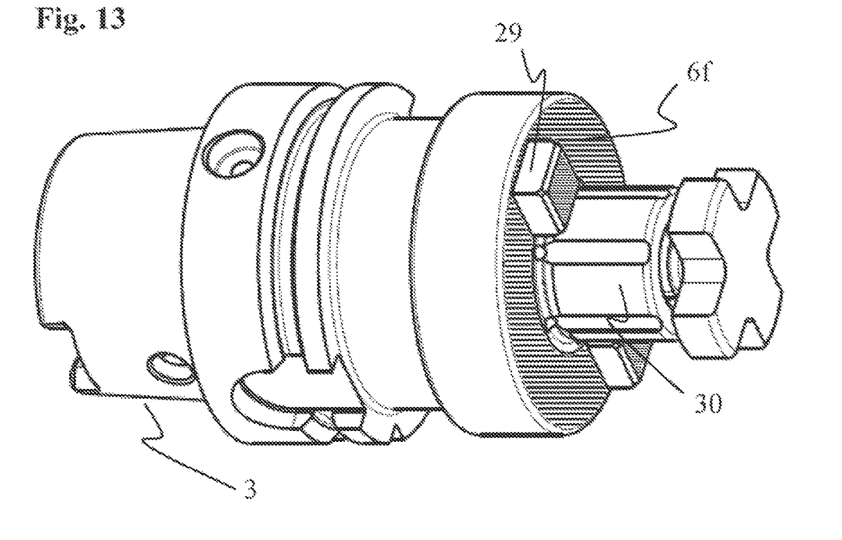
FIG. 13 shows an embodiment example with a cutter head receptacle coated with an alloy made of a shape memory material.
Figure 14:
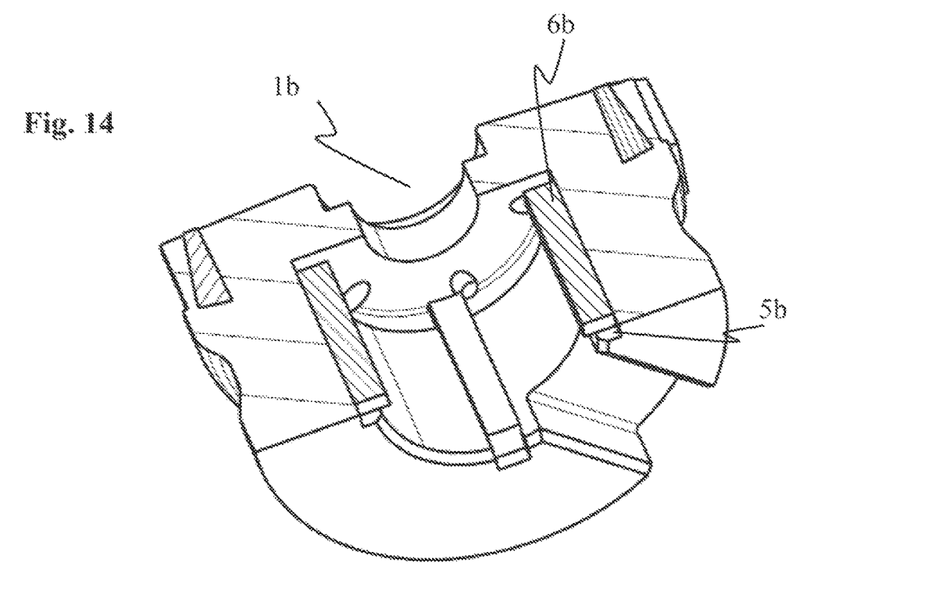
FIG. 14 shows an embodiment example with a cutter head having bar-shaped shape memory elements.

FIG. 13 shows an embodiment of the present invention on the contact surfaces of a tool holder 3 for holding cutter heads. A damping element 6*f* in the form of a coating made of a shape memory material is applied to the surfaces of contact between the cutter head receptacle and a cutter head 1*b* as shown in FIG. 14. In addition, the drive blocks 29 can be coated with a shape memory material as well or even be configured in the form of a shape memory element which is completely or partially made of a shape memory material.

As a result of the pseudoelastic effect, both damping between the tool holder 3 and the cutter head 1*b* occurs and contact is improved, and, last but not least, the holding force resulting from the elastic deformation is increased.

FIG. 14 shows the implementation of the invention on a cutter head 1*b*. Since on a cutter head 1*b*, the tool is slipped onto the pivot 30 of a cutter tool receptacle, the damping elements 6*b* according to the present invention are disposed in the grooves 5*b* on the inside of the cutter head 1*b*. This results in a damping according to the present invention between the tool holder 3 and the tool which in this case is a cutter head 1*b*. Further advantages follow by analogy from the descriptions for FIGS. 9, 10 and 11. It goes without saying that it is also possible to reverse the affixation of the damping elements 6*b* within the system, which means to configure the grooves 5*b* as well as the associated damping elements 6*b* on the pivot 30 of the tool holder 3.

The present invention is not limited to the described embodiment examples, but can be varied with respect to the use of the damping elements made of a shape memory material. It also especially covers variants that can be obtained by combining features and/or elements described in the present invention. All features described in the present invention and following from the drawings are additional elements of the invention, even if they are not specifically described and mentioned in the claims. In addition, it clearly follows from the description that the teaching of the present invention can be implemented both in a tool holder and on a tool as well as on a cutter head.

LIST OF REFERENCE CHARACTERS

1 Cutting tool
1*b* Cutter head
2 Cylindrical shank
3 Tool receptacle
4 Receiving element
5 Cylindrically shaped recess in the receiving element
5*b* Cylindrically shaped recess in the receiving element
5*c* Annular recess in the receiving element
5*d* Cylindrically shaped recess in the receiving element
6 Sleeve-shaped damping element made of a shape memory material
6*b* Bar-shaped damping element made of a shape memory material
6*c* (Partially) annular damping element made of a shape memory material
6*d* Bar-shaped damping element made of a shape memory material in Configuration I
6*e* Bar-shaped damping element made of a shape memory material in Configuration II
6*f* Damping element in the form of a coating of shape memory material
7 Lateral surface
8 Cylindrically shaped recess in the shape memory element
9 Tapered bore
10 Collet chuck
11 Central screw
12 Clamping segments
13 Annular or pin-shaped damping element made of a shape memory material
13*b* Annular damping element made of a shape memory material on the outside
14 Base mount
15 Inner bore
16 Collet chuck
17 Tool module
18 Shank of the tool module
19 Tapered bore
20 Contact surface of the tool module
21 Contact surface of the base mount
22 Boring bar
23 Flange
24 Receiving element
25 Screw
26 Sleeve-shaped damping element made of a shape memory material
27 Relief or coolant-carrying groove
28 Coolant through-bore
29 Drive blocks
30 Pivot

The invention claimed is:

1. One or more damping elements for tool chucking systems for damping vibrations and shocks that occur during machining when force-fittingly clamping a tool in a tool receptacle, wherein at least one damping element comprises a shape memory alloy having a mechanical shape memory effect that occurs through action of an external force without influence of an external change in temperature, such that the at least one damping element, which in a chucked state is disposed in a force flow of chucked elements, is in a state of reversible and hysteresis-dependent deformation with its associated crystalline transformation as a result of the damping element having been pretensioned by action of a mechanical force, which leads to dissipation of mechanical energy, with the mechanical energy to be damped being a cyclic vibration or constituting a non-cyclic overload which is transmitted in form of shocks, the at least one damping element being disposed in the tool receptacle or on the tool itself.

2. The damping elements as in claim 1, wherein the at least one damping element is completely made of the shape memory alloy.

3. The damping elements as in claim 1, wherein a core of the at least one damping element is made of a material not having shape memory properties which is coated with the shape memory alloy.

4. A tool receptacle for use in a system as in claim 1, wherein the tool receptacle comprises the at least one damping element.

5. A tool for use in a system as in claim 1, wherein the at least one damping element is disposed on the tool.

6. The damping elements as in claim 1, wherein the at least one damping element is partially made of the shape memory alloy.

7. The damping elements as in claim 1, wherein the mechanical shape memory effect of the shape memory alloy is induced by mechanical stress.

8. The damping elements as in claim 1, wherein the tool receptacle comprises a hydraulic expansion chuck that does not employ a change in temperature when clamping the tool in the tool receptacle.

9. One or more damping elements for tool chucking systems for damping vibrations and shocks that occur during machining when force-fittingly clamping a tool in a tool receptacle, wherein at least one damping element comprises a shape memory alloy having a mechanical shape memory effect and is disposed in the tool receptacle or on the tool itself, such that the at least one damping element, which in a chucked state is disposed in a force flow of chucked elements, is in a state of reversible and hysteresis-dependent deformation with its associated crystalline transformation as a result of the damping element having been pretensioned by action of a mechanical force, which leads to dissipation of mechanical energy, with the mechanical energy to be damped being a cyclic vibration or constituting a non-cyclic overload which is transmitted in form of shocks, and the at least one damping element comprising the shape memory alloy is configured in form of a sleeve and is disposed between a cylindrical shank of the tool and a receiving element of the tool receptacle, with the cylindrical shank of the tool being force-fittingly held in a cylindrically shaped recess in the at least one damping element.

10. A system comprising:
a tool receptacle; and
a tool,
wherein the tool receptacle and/or the tool includes at least one damping element for damping occurring vibrations and shocks, the at least one damping element comprising a shape memory element which comprises a shape memory alloy having a mechanical shape memory effect that occurs through action of an external force without influence of an external change in temperature, and the at least one damping element comprising the shape memory alloy is disposed in a recess provided in the tool receptacle or in a groove provided in the tool.

11. The system as in claim 10, wherein the at least one damping element also generates a holding force between the tool receptacle and a shank of the tool.

12. The system as in claim 11, wherein the holding force is not completely generated by the at least one damping element.

13. The system as in claim 10, wherein the at least one damping element comprises a variety of shape memory elements having different properties.

14. The system as in claim 10, wherein a holding force between the tool receptacle and a shank of the tool is not generated by the at least one damping element.

15. The system as in claim 10, wherein the shape memory alloy has a mechanical shape memory effect that is induced by mechanical stress.

16. The system as in claim 10, wherein the at least one damping element comprising the shape memory alloy is disposed in a recess provided in the tool receptacle.

17. The system as in claim 16, wherein the recess provided in the tool receptacle is a cylindrical or annular recess.

18. The system as in claim 10, wherein the at least one damping element comprising the shape memory alloy is disposed in a groove provided in the tool.

* * * * *